July 2, 1935.          G. B. HAGEN                2,006,806
                  RECTIFIER ARRANGEMENT
                  Filed Aug. 15, 1930

INVENTOR
GERHARD B. HAGEN
BY
ATTORNEY

Patented July 2, 1935

2,006,806

UNITED STATES PATENT OFFICE 2,006,806

RECTIFIER ARRANGEMENT

Gerhard B. Hagen, Berlin, Germany, assignor to Telefunken Gesellschaft für Drahtlose Telegraphie m. b. H., Berlin, Germany, a corporation of Germany Application August 15, 1930, Serial No. 475,479
In Germany August 16, 1929

4 Claims. (Cl. 175—363)

The present invention relates to rectifying systems and the like, one of its main objects being to provide a method of rectification by means of a novel circuit arrangement whereby the form of rectified current produced is more susceptible to being smoothed out.

Figure 1:
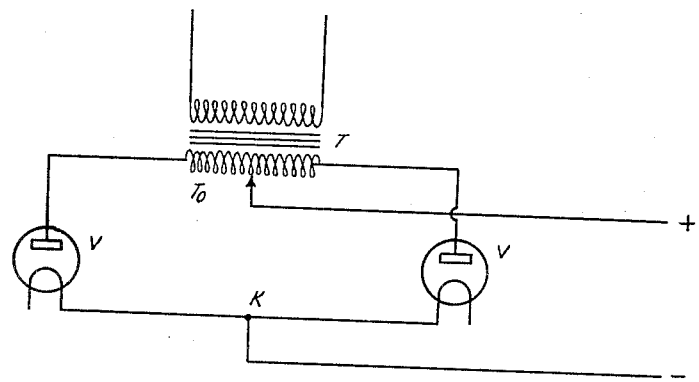
Figure 2:
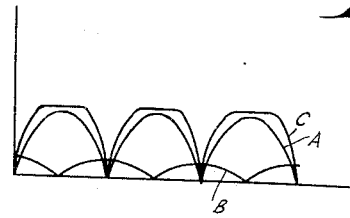

The above and other objects of the invention will be evident from reading the following specification in conjunction with the drawing. In the drawing, Fig. 1 illustrates in diagrammatic form of a pair of two element rectifiers and a circuit arrangement therefor; Fig. 2 shows a series of curves used in explaining the present invention; and, Fig. 3 shows diagrammatically a preferred embodiment of the invention in connection with three element tubes.

For the purpose of rectifying alternating current it is usual to employ two valves connected in phase-opposition as shown in Fig. 1, the potential to be rectified being supplied to the anodes of the tubes by way of a transformer T. By such a scheme a pulsating direct current potential is obtained between the middle $T_0$ of the anode or plate transformer and the cathode K of the tubes (curve A, Fig. 2). In order to insure rectification under more favorable conditions, triode tubes connected push-pull-fashion are employed according to this invention, the invention further disclosing ways and means adapted to obtain a grid potential being in quadrature relationship with the plate potential (curve B).

In this manner the plate potential curve as shown in graph C, Fig. 2, is distorted.

Figure 3:
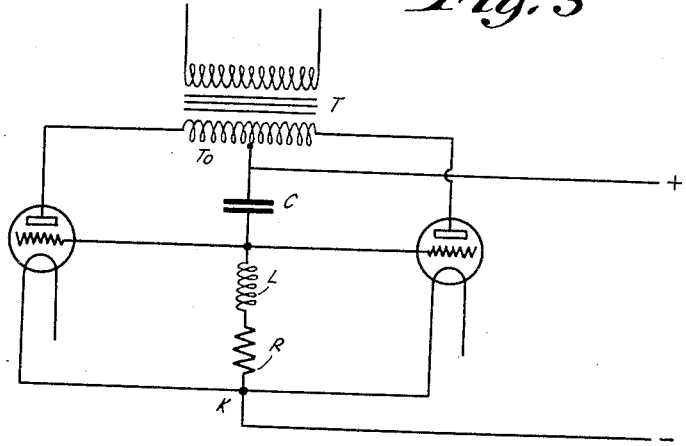

In Fig. 3 the potential to be rectified is supplied to the plates as heretofore in phase opposition. The middle of the secondary coil of T serves for deriving the positive potential and is associated by way of the condenser C with the grids. The grid leak consists of the resistance R and inductance coil L being tuned by C so as to establish potential resonance with the working wave. In this manner the potential fed to the grids is shifted an angle of 90 degrees with reference to the plate potential variations. The negative potential is taken off from the cathodes at point K.

I claim:

1. In a system for changing alternating current into pulsating direct current, a pair of electronic rectifiers each thereof having a cathode, an anode and a control electrode, an input transformer having its primary connected to a source of alternating current, a circuit including the secondary of the transformer for connecting the anodes of the two rectifiers, a connection between said two cathodes, a connection between said two control electrodes, a condenser connected between the midpoint of said secondary and said control electrodes connection, an inductance and a resistance in series connected between said control electrodes connection and said cathodes connection, and a utilizing circuit connected between said secondary midpoint and said cathodes connection.

2. In a rectifier circuit a space discharge device having an anode, a cathode and a control grid, a load connected between the anode and cathode of said device, means for supplying a potential to the anode of said device comprising a source of alternating current connected between the anode and cathode thereof, means for supplying said control electrode with a potential in quadrature relationship to the potential supplied to the anode comprising, a condenser, an inductive reactor and a resistor connected serially across the load circuit and arranged with respect to the tube so that the grid of said tube is connected to a point of said series elements between the condenser and inductor, said means acting to distort the characteristic direct current pulsations supplied to the load circuit from the rectifier.

3. In a rectifier circuit an electronic tube having an anode, a cathode and a control electrode, a source of alternating current and means for impressing the alternating current from said source between the anode and cathode of said tube, a load circuit connected between the anode and cathode of said tube in series with the means for impressing said alternating current and means for supplying the grid electrode with a potential in quadrature relationship to the anode potential comprising, a direct current path including an inductive device connected between the control electrode and the cathode and a capacitive path between the anode and the control electrode said capacitive path acting also to tune said path to substantially the frequency of the energy supplied to the anode potential.

4. In a rectifier circuit a pair of electronic tubes each thereof provided with anode, cathode and a control electrode, a source of alternating current, a transformer having a primary winding connected across said source and a secondary winding included in a connection between the anodes of said tubes, a connection between the cathodes of said tubes and a connection between the control electrodes of said tubes, a load circuit connected between a point intermediate the secondary winding and a point of said cathode connection, a series circuit comprising a condenser and an inductive reactor connected serially across the load circuit and means for connecting said common grid connection to a point between the condenser and the inductive reactance, said serially arranged elements acting to distort the characteristic direct current pulsations of the output of the rectifier.

GERHARD B. HAGEN.